(No Model.) 2 Sheets—Sheet 1.

I. F. BAKER & W. R. McLAIN.
ELECTRIC RAILWAY MOTOR SHIELD.

No. 551,664. Patented Dec. 17, 1895.

WITNESSES:

INVENTORS
Isaac F. Baker
William R. McLain
BY
ATTORNEY.

(No Model.) 2 Sheets—Sheet 2.
I. F. BAKER & W. R. McLAIN.
ELECTRIC RAILWAY MOTOR SHIELD.
No. 551,664. Patented Dec. 17, 1895.
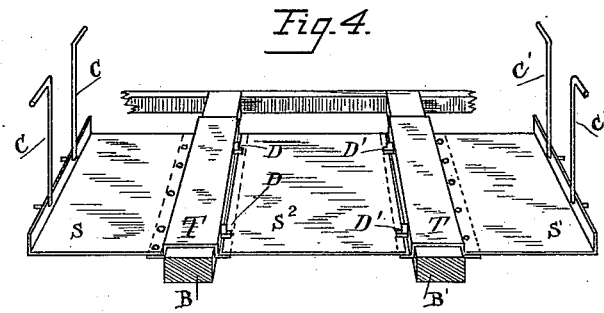
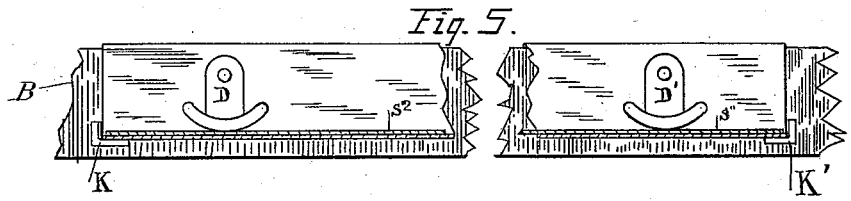
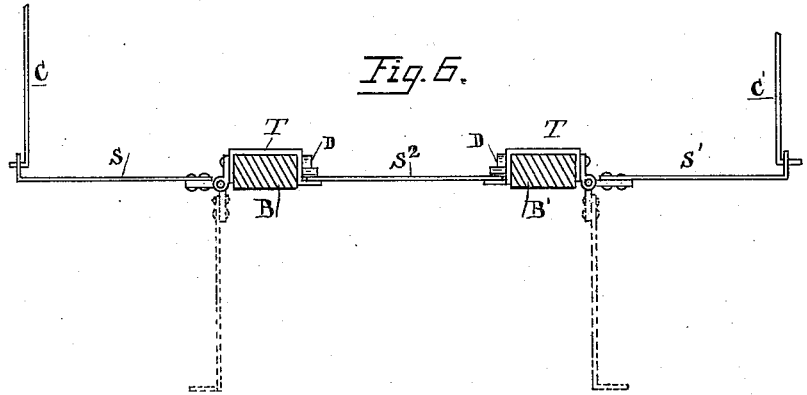
WITNESSES:
INVENTORS
Isaac F. Baker
William R. McLain
BY
H. C. Townsend
ATTORNEY.

UNITED STATES PATENT OFFICE.

ISAAC F. BAKER AND WILLIAM R. McLAIN, OF LYNN, MASSACHUSETTS, ASSIGNORS TO THE THOMSON-HOUSTON ELECTRIC COMPANY, OF CONNECTICUT.

ELECTRIC-RAILWAY-MOTOR SHIELD.

SPECIFICATION forming part of Letters Patent No. 551,664, dated December 17, 1895.

Application filed November 25, 1889. Serial No. 331,523. (No model.)

*To all whom it may concern:*

Be it known that we, ISAAC F. BAKER, a subject of the Queen of England, and WILLIAM R. McLAIN, a citizen of the United States, and residents of Lynn, in the county of Essex and State of Massachusetts, have invented certain new and useful Electric-Railway Motors, of which the following is a specification.

Our invention relates to certain improvements in electric-railway motors, in which the electric motor is suspended or sustained in position beneath the car and quite near the ground. In electric-railway motors in which this organization or arrangement of motor is employed, the electric motor is liable to injury from pieces of iron—such as iron wire, nails, or other bits of metal—lying upon the road-bed, and which, through the magnetic attraction of the motor, are picked up and being caught in the armature in its revolution injure the insulation, displace the wire and, in many cases, ruin the motor.

Our invention consists in the combination, with an electromagnetic motor supported on a car or vehicle in such proximity to the ground as to be able, by its magnetic attraction, to pick up small bits of metal lying on the ground, of a hinged pan or shield suspended or supported beneath the motor and suitable devices for detachably securing the free end of said hinged pan in its elevated position, substantially as hereinafter set forth.

Our invention consists further in certain preferred constructions of devices for supporting the shield or shields employed.

Figure 1:
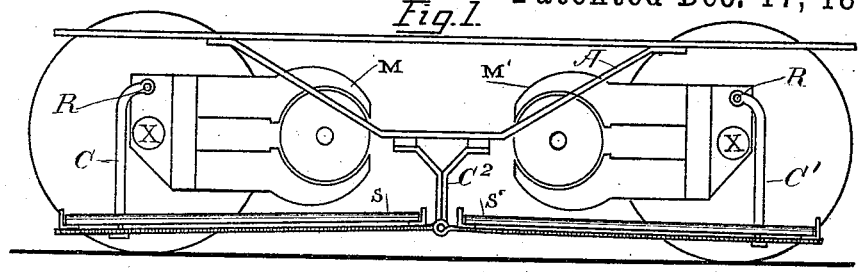
Figure 2:
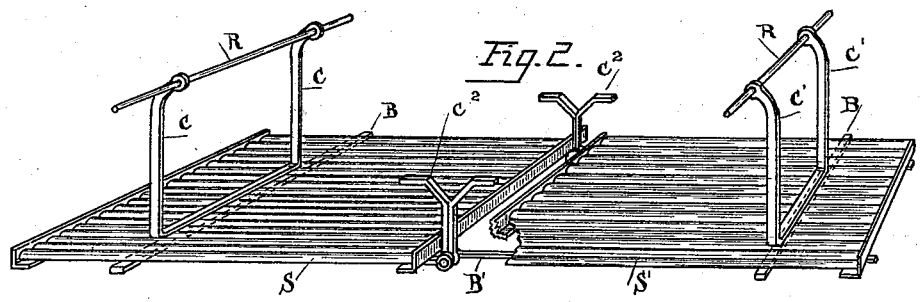
Figure 3:
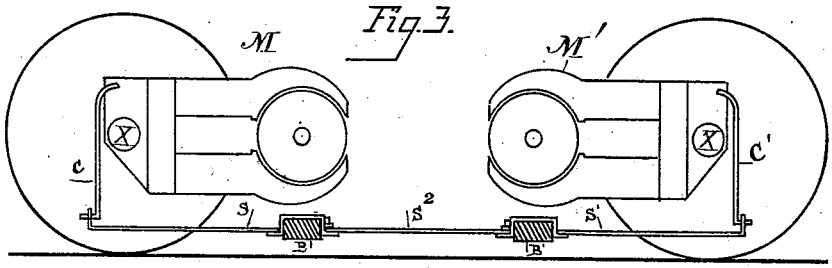

In the accompanying drawings, Figure 1 is a skeleton elevation illustrating the application of our invention to a vehicle such as an electric-railway car propelled by magnetic motors. Fig. 2 is a perspective view of the shield and supporting devices. Fig. 3 shows in side elevation a modification in the arrangement of the shield or shields when two electric motors are employed. Fig. 4 is a perspective view of the shields shown in Fig. 3. Fig. 5 illustrates a means that may be employed for the purpose of fastening a portion of the shield in position so that it can be readily removed when desired. Fig. 6 shows how the shields may be swung down out of position to give access to the motor.

Referring to Fig. 1, which shows the invention as applied to a car having two electric motors, M M' indicate in outline two electromagnetic motors of any usual construction mounted or supported beneath the car in any usual or proper manner. In the present instance they are shown as hung at one end on the axles X of the car, which pass through extensions from the field-magnet.

S S' are shields, preferably of iron, extending horizontally below the motors between the same and the ground and to a considerable distance beyond the motors at either end and side. The shields are hung or supported from the motor truck or framework, or from the car-sill, in any desired or proper manner. A convenient means of supporting and hanging the shields consists of iron bars B B', forming a sort of framework on which the shields rest, and hangers C C' C$^2$, which sustain or support said framework and shields from the car-truck frame, or the motors, or the car-body, as desired. A convenient and preferable arrangement is shown in the figures, where we have shown the hangers C C' as sustained on rods R R', which pass through holes drilled in the motor field-magnets, and which may be readily removed when desired in order to detach the hangers and the shields for the purpose of repair, renewal, or to allow the shields to swing downward or be removed in order to permit access to the motors. The shields or parts immediately supporting the same, as the bars or frame B B', are preferably hinged at the points of attachment or support upon the hangers C$^2$ C$^2$, the latter being attached, as shown, to a bar A or other part carried by the motor truck or framework. By thus hinging the shields they will be free to be dropped or swung downward into the position indicated in Fig. 6, when the rods R R' are pulled out. For the purpose of so swinging the shields downward the car is usually drawn over a pit provided for the purpose.

As shown, the shield is made of corrugated iron or other material and for this special purpose—to wit: we find that when it is made of flat sheet metal it frequently vibrates so much that any oil collected on it by dropping down from the oil-cups of the motor will be thrown upward against the windings of the field and armature for the electric motor, saturating them and destroying the insulation. We have found, however, that by corrugating the shield, as shown, we are enabled to entirely avoid this difficulty, since the vibration is destroyed to a great extent. Another advantage is that the noise is greatly lessened, and besides the shields may be made of considerable size without incurring the difficulty due to vibration and the throwing of oil upon the electric motor.

If desired, three shields or sections of shield might be used with the two magnetic motors, as indicated in Fig. 3, the intermediate or middle section of shield $S^2$ being supported upon cross-pieces B B', as indicated.

T T indicate iron flange-supports which rest upon the cross-bars and have projections or flanges upon which the shields impinge directly, as shown more clearly in Fig. 4.

K K', Fig. 5, indicate stops which serve to hold the shield $S^2$ from lateral movement. Cams or buttons D D', hinged upon the cross-bars, may be used to hold the shield $S^2$ from vertical movement. By rotating the cams or buttons the shield $S^2$ may be raised until it clears the pieces K K', when it can be taken out sidewise.

In Figs. 3 and 4 the end shields S S' are supported upon the flanges of pieces T T, and may be, if desired, fastened thereto. The hangers C C', at the outer ends of the shields S S', may be formed as shown in Fig. 4, their upper ends serving as rock-shafts, mounted in suitable sockets, while their lower ends have hooks which engage with the upturned ends of the shields and may be disengaged by swinging the hooks on their shaft. By making the shields in three sections, as shown, each section may be shorter and the vibration effects will, therefore, not be so marked. The end of shields S S' might be hinged to the flange or projection from supports T T, as clearly shown in Fig. 6, in which case, by simply rotating or swinging the hooks C C' on their supports, so as to disengage them from the outer ends of the shields S S', the latter may be swung down into the position shown in Fig. 6, thus giving access to the motors, the running-gear, journals, &c., when desired.

By the use of our invention we overcome a serious practical difficulty which has been met with in the operation of electric-railway motors and at small expense. The motors, inasmuch as they have their fields highly energized, will exert an attraction sufficient to pick up any small pieces of metal which will be intercepted by the shields and will be frequently held against the lower side of the shield and transported with the motor, but without any possibility of becoming caught in the armature-field thereof.

What we claim as our invention is—

1. The combination in an electric railway car, of a propelling electric motor sustained or supported beneath the body of the car, as described, and a protective pan or shield formed in jointed sections and sustained between the motor and the ground, and suitable fastening devices for detachably securing the free end of the pan in elevated position, substantially as set forth.

2. The combination with a propelling electric motor for a railway vehicle sustained or supported in close proximity to the ground, of a hinged protective shield or pan sustained or supported beneath the motor and provided with suitable fastening devices for detachably securing the free end of said pan in elevated position beneath said motor.

3. The combination in an electric railway car, of a propelling electric motor supported beneath the car body in close proximity to the ground as described, a shield interposed between the motor and the ground for the purpose of intercepting bits of magnetic material attracted from the ground, a pivoted or swinging hook sustaining the shield at one end, and a hinge at the other end of the shield whereby said shield may be swung down into position to permit access to the motor and running gear, as and for the purpose described.

Signed at Lynn, in the county of Essex and State of Massachusetts, this 22d day of November, A. D. 1889.

ISAAC F. BAKER.
WILLIAM R. McLAIN.

Witnesses:
JOHN W. GIBBONEY,
MERLE J. WIGHTMAN.